(No Model.) 2 Sheets—Sheet 1.

W. COOPER.
LIGHTNING ARRESTER.

No. 561,073. Patented May 26, 1896.

Witnesses:
C. E. Van Doren
Frederick S. Lyon

Inventor:
William Cooper
by Paul A. Hawley
his Attys.

(No Model.) 2 Sheets—Sheet 2.

W. COOPER.
LIGHTNING ARRESTER.

No. 561,073. Patented May 26, 1896.

Witnesses:
C. E. Van Doran.
Frederick S. Lyon

Inventor:
William Cooper
by Paul O. Hawley
his atty.

UNITED STATES PATENT OFFICE.

WILLIAM COOPER, OF SCHENECTADY, NEW YORK, ASSIGNOR TO THE GENERAL ELECTRIC COMPANY, OF NEW YORK.

LIGHTNING-ARRESTER.

SPECIFICATION forming part of Letters Patent No. 561,073, dated May 26, 1896.

Application filed September 23, 1895. Serial No. 563,285. (No model.)

*To all whom it may concern:*

Be it known that I, WILLIAM COOPER, of Schenectady, Schenectady county, State of New York, have invented a certain new and Improved Lightning-Arrester, of which the following is a specification.

My invention relates to means for arresting lightning in its course toward and through electric devices or machines; and the particular object which I have in view is to provide a lightning-arrester of a greater degree of reliability than has hitherto been obtained, and which will be positive in its action and which, moreover, will be of a cheap construction.

My invention consists generally in an air-tight box having terminals arranged with a gap between them in the air-tight chamber, lines of wire connected respectively to the terminals, and a weak cover that is adapted to be blown away when a gas is formed in the air-tight chamber by the burning of the terminals, all as hereinafter described, and particularly pointed out in the claims.

Figure 1:
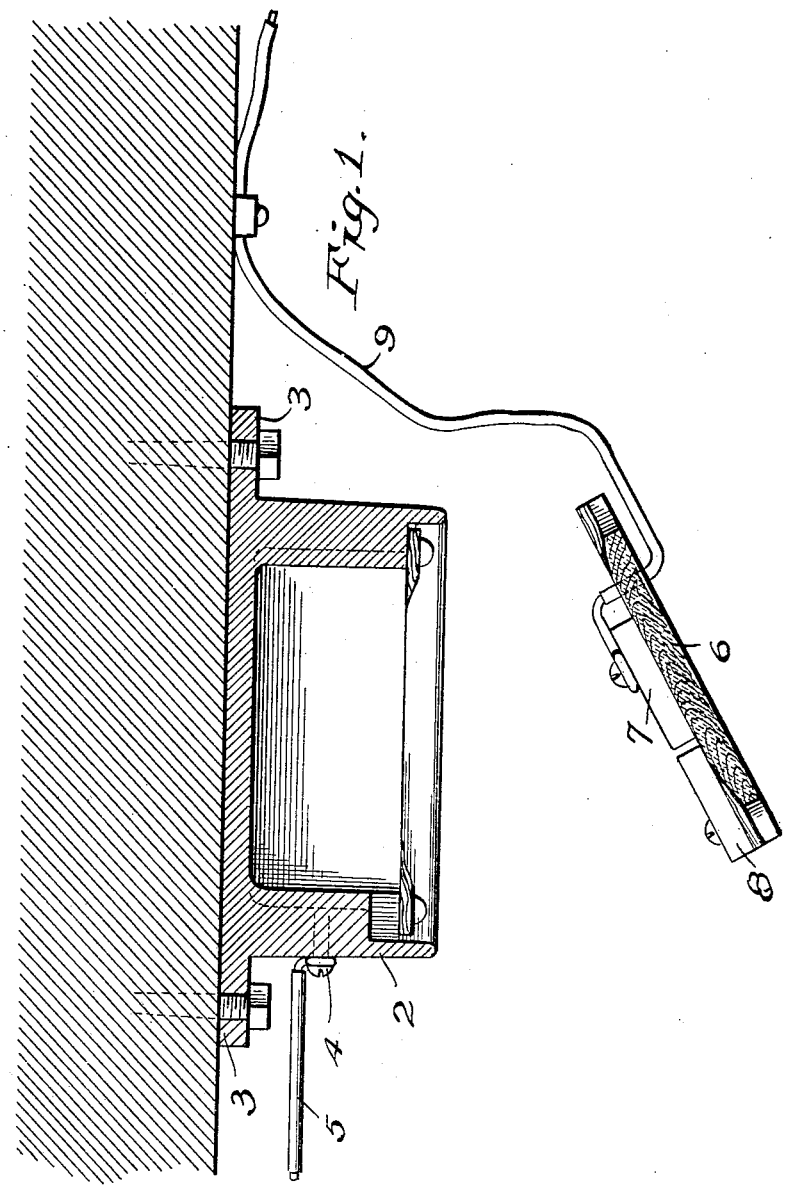
Figure 4:
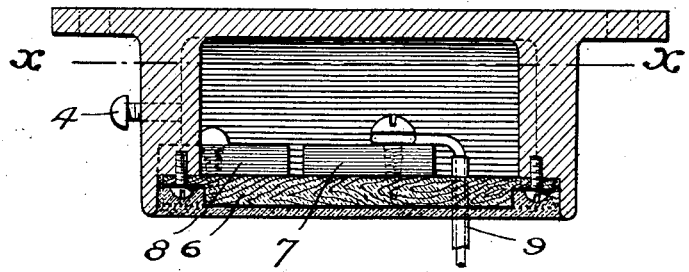
Figure 3:
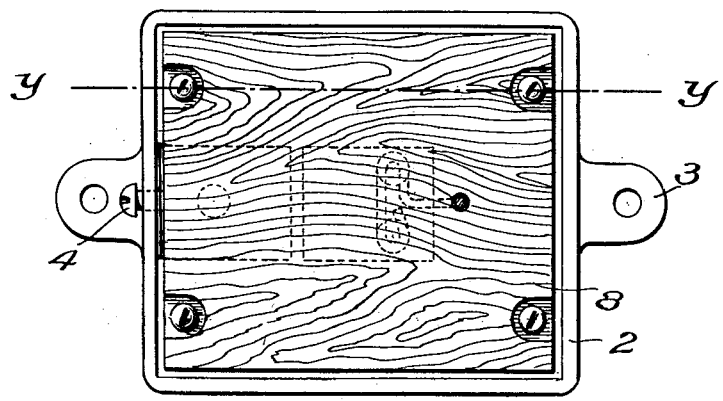
Figure 2:
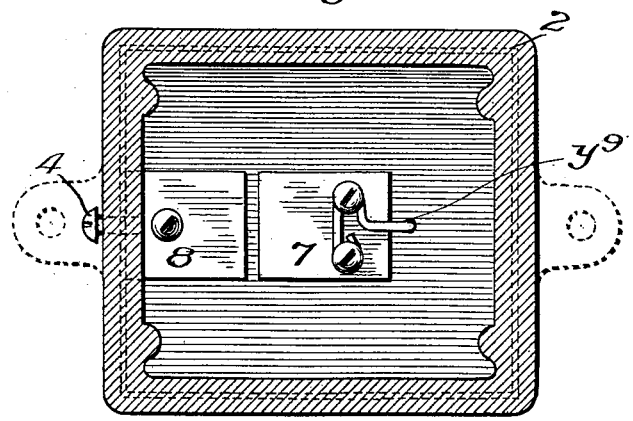

In the drawings forming part of this specification, Figure 1 is a longitudinal and vertical section of a lightning-arrester embodying my invention, showing the cover blown away from the box after the lightning has passed through the arrester. Fig. 2 is a horizontal section on the line $x\ x$ of Fig. 4, showing the carbons arranged on the cover and the space between them. Fig. 3 is a plan view of the top of the cover, showing the screws which secure the cover to the box. Fig. 4 is a longitudinal and vertical section on the line $y\ y$ of Fig. 3, showing the cover fastened onto the box and sealed.

In the drawings, 2 represents a cast-metal box of suitable size secured to a wall or beam by screws or bolts passing through the lugs 3. The box 2 is provided with the binding-screw 4, to which the line-wire 5 is secured. The upper inside edge of the box is countersunk and adapted to receive the wooden cover 6. The top of the wooden cover is countersunk to receive screws which pass through the cover and into lugs provided on the inside of the box. It will be noticed that by being countersunk the cover is greatly weakened, so that a strain upon the inside will burst it open. Secured upon the inside of the wooden cover are the two carbons 7 and 8. The carbon 7 is insulated from the box and is connected to the line-wire 9, which passes through an opening provided in the cover 6. One end of the carbon 8 is adapted to fit into a recess in the inside of the box and make connection therewith, while the other end is arranged a short distance from the end of the carbon 7, so that when the current of electricity passes along the wires through the box an arc will be formed between the two carbons. After the connections have been made and the cover fastened on the whole space over the cover is filled with paraffin, thereby excluding the air from the interior of the box. Should a line-wire be struck by lightning, the electricity would be carried along the wire into the box and would form an arc as it passes along from carbon to carbon. The arc so formed being confined in the air-tight receptacle, the burning carbon would create a gas which would blow the cover off the box, and thereby break the circuit, as shown in Fig. 1. It is obvious that the construction of the metal box might be varied or a cover of any suitable non-conducting material might be used, and the arrangement of the carbons and the method of securing the cover might be varied without departing from the spirit of my invention.

Having thus described my invention, I claim as new and desire to secure by Letters Patent—

1. The combination, with the air-tight box, of terminals arranged therein, a weak cover provided for said box, one of said terminals being provided upon the box, and the other upon the cover, a gap being provided between the terminals, and said cover adapted to be blown off the box when gas is formed by the burning of an arc between said terminals, substantially as described.

2. The combination, with an air-tight metal box, of a terminal provided therein and connected therewith, a weak cover provided for said box, a terminal connected with the cover and insulated from the other terminal, a gap provided between the terminals, and said cover adapted to be blown off by the pressure of gas formed by the burning of said terminals, and to separate said terminals, substantially as described.

3. The combination, with an air-tight metal box having a weak cover of insulating material, a carbon terminal provided within the box and secured thereon, a second carbon terminal secured upon said cover with a gap between the same and the first terminal, and line-wires connected respectively to said box and to the insulated carbon, said cover adapted to be blown off by pressure of gas formed by the burning of the terminals, and when so separated from the box to carry away one of the terminals, substantially as described.

4. The combination, with the tight metal box provided with the countersunk edge, a wooden cover secured to said countersunk edge, means for hermetically sealing the said cover, carbons secured to the inside of said cover in contact with said box, the second carbon secured to the inside of said cover and insulated from said box, a gap being provided between the two carbons, and line-wires connected respectively to said box and insulated carbon, substantially as described.

In testimony whereof I have hereunto set my hand this 23d day of June, A. D. 1894.

WILLIAM COOPER.

In presence of—
  W. P. GARNSEY,
  HANFORD ROBISON.